June 2, 1925.  
B. H. JEFFERSON ET AL  
1,540,739  
COMBINED PIANO AND PRACTICE INSTRUMENT  
Filed Dec. 16, 1918   3 Sheets-Sheet 1
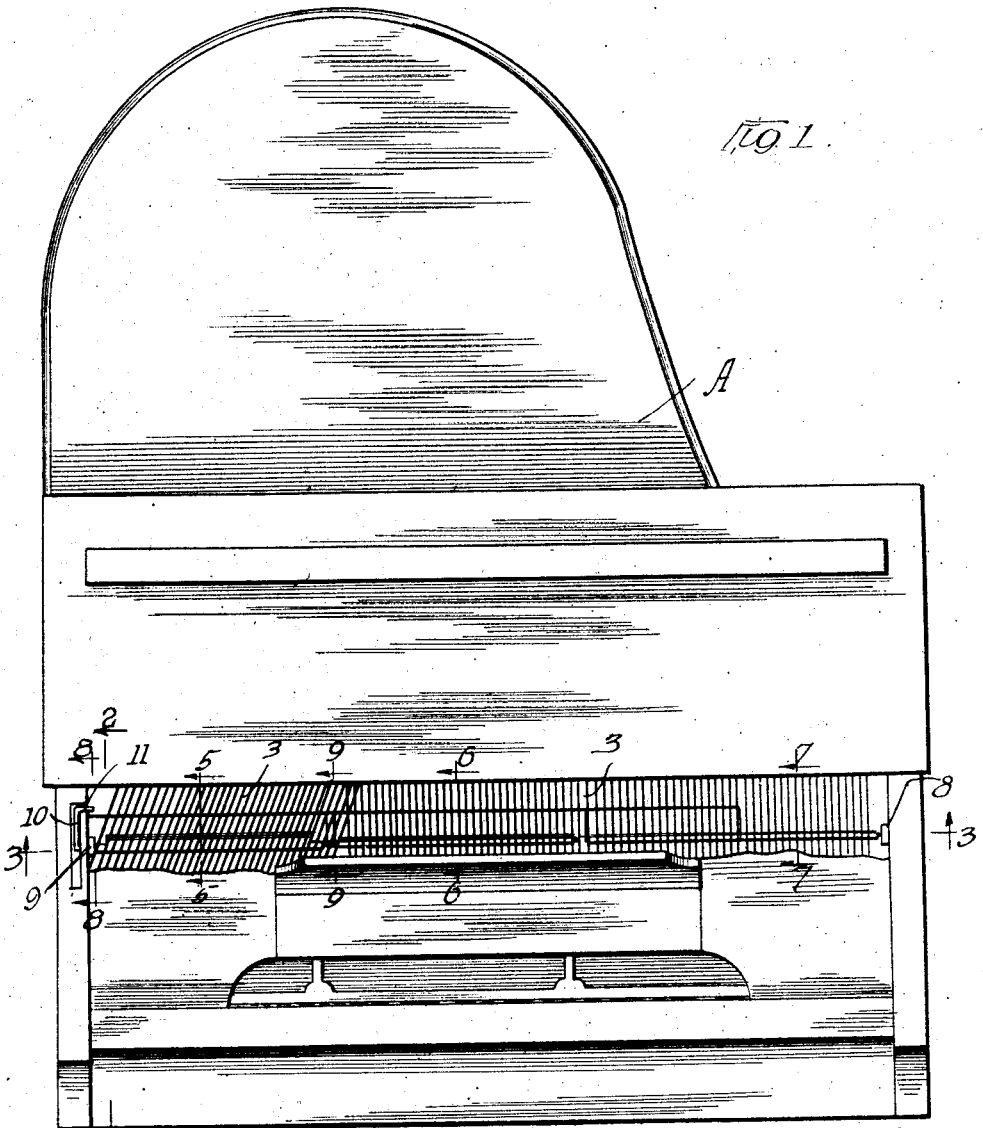

June 2, 1925.  
B. H. JEFFERSON ET AL  
1,540,739
COMBINED PIANO AND PRACTICE INSTRUMENT
Filed Dec. 16, 1918  3 Sheets-Sheet 2
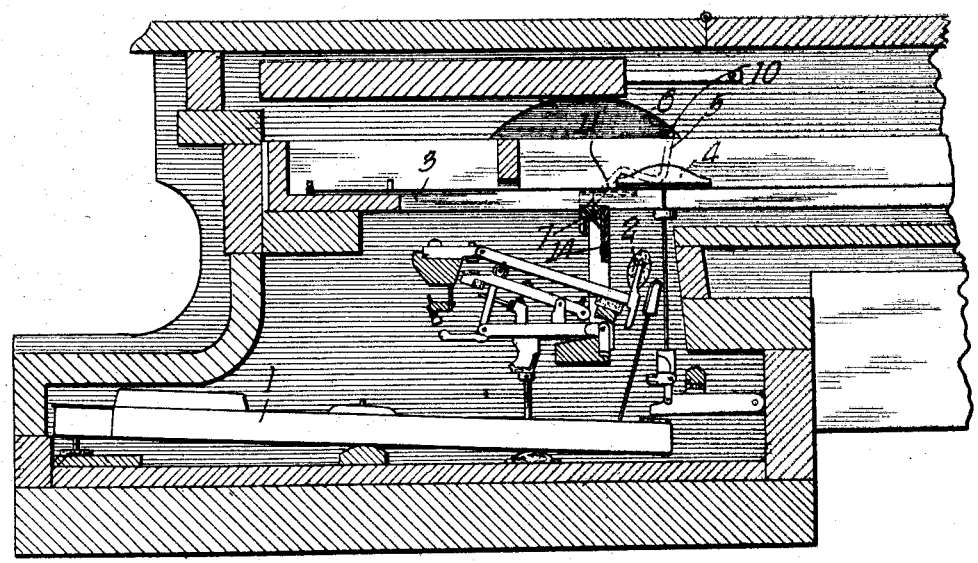
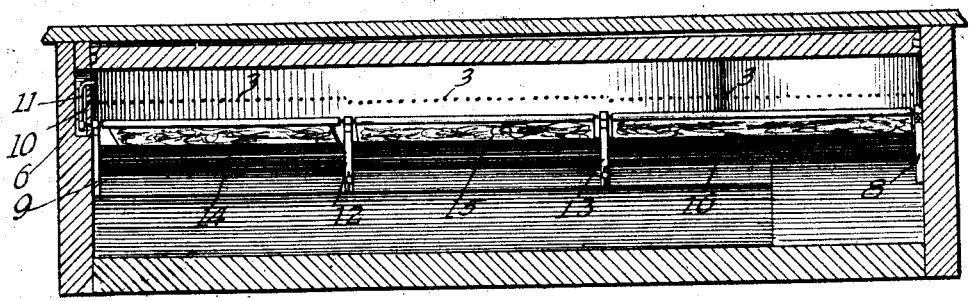

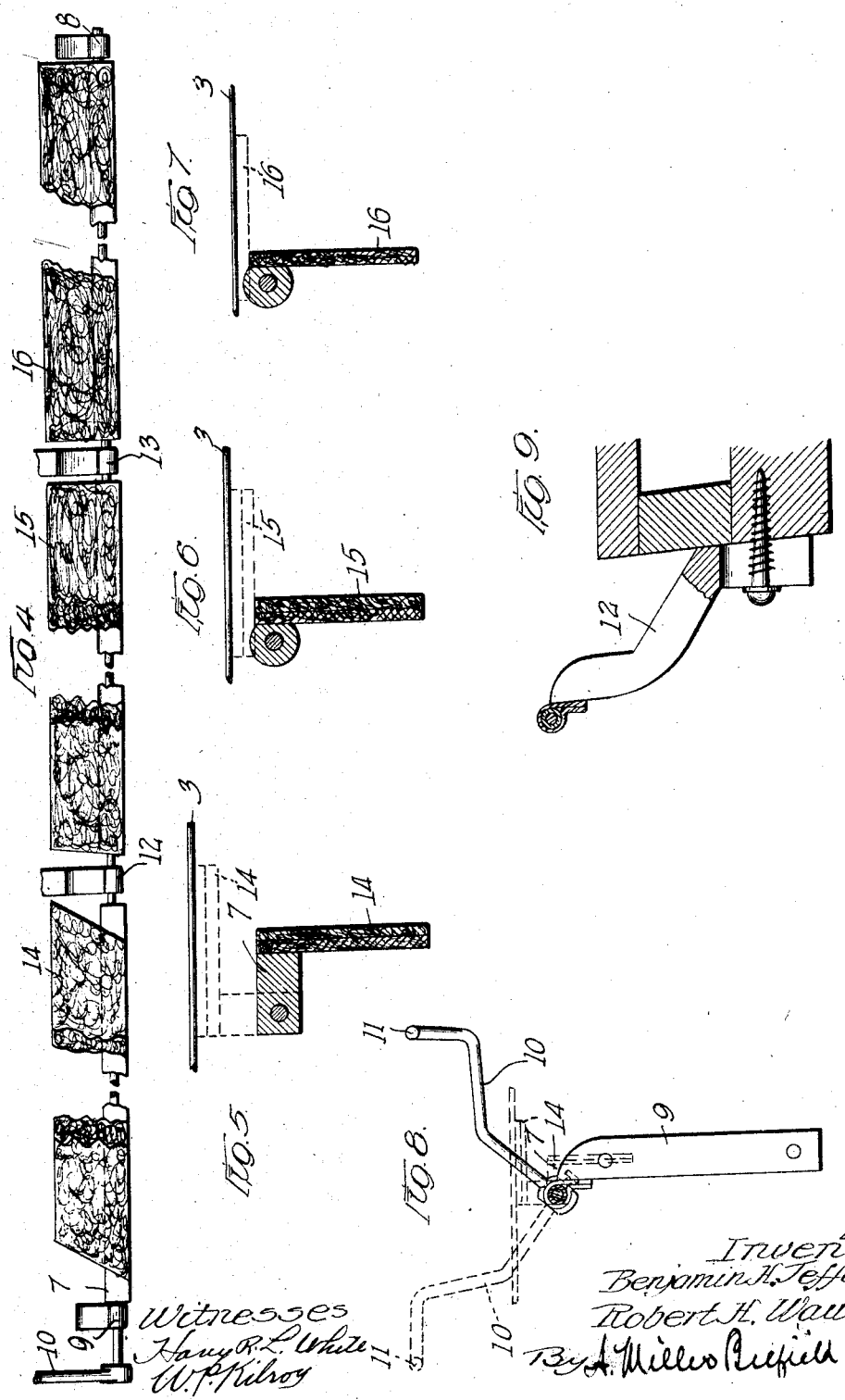

Patented June 2, 1925.

1,540,739

UNITED STATES PATENT OFFICE.

BENJAMIN H. JEFFERSON AND ROBERT H. WAUD, OF CHICAGO, ILLINOIS, ASSIGNOR, BY MESNE ASSIGNMENTS, TO LYON & HEALY, INC., OF CHICAGO, ILLINOIS, A CORPORATION OF ILLINOIS.

COMBINED PIANO AND PRACTICE INSTRUMENT.

Application filed December 16, 1918. Serial No. 266,859.

*To all whom it may concern:*

Be it known that we, BENJAMIN H. JEFFERSON and ROBERT H. WAUD, citizens of the United States, residing at Chicago, in the county of Cook and State of Illinois, have invented a certain new and useful Improvement in Combined Pianos and Practice Instruments, of which the following is a full, clear, concise, and exact description, reference being had to the accompanying drawings, forming a part of this specification.

Our invention relates to combined piano and practice instrument.

The principal object of the invention is to provide an instrument which may be used either as a piano in the usual way, or as a practice instrument or clavier.

Another object of the invention is to arrange for the easy control of the instrument, so that it may be readily arranged for either one use or the other, as desired; also to permit a quick transformation from one use back to the other, and so on.

Another object of the invention is to permit barely audible sounds or tones to be heard when the instrument is to be used for practice, thereby securing an advantage over the ordinary practice instrument which gives no musical sounds or tones, and therefore fails to inform the operator or player of mistakes.

Another object of the invention is to permit operation and control of the instrument in the manner customary in pianos, with fine qualities musically and mechanically, notwithstanding the duplex nature of the instrument.

A further object of the invention is to secure simplicity and efficiency in construction and operation.

A further object is to accomplish the foregoing and other desirable results in a practical and expeditious manner.

In the accompanying drawings Fig. 1 is a plan view of a grand piano embodying our present invention;

Fig. 2 is a vertical section on line 2—2 in Fig. 1, on an enlarged scale;

Fig. 3 is a cross section taken on line 3—3 in Fig. 1;

Fig. 4 is a view of a detail of construction;

Figs. 5, 6, 7, 8 and 9 are detail cross sectional views on an enlarged scale taken on lines 5—5, 6—6, 7—7, 8—8 and 9—9 in Fig. 1.

Referring to the drawings we show the invention applied to a grand piano A, although it will be understood that in its general aspect the invention may be applied to other makes or types of piano.

The instrument A is shown with piano keys 1 and an action having hammers 2 arranged to strike against strings 3. The action is operated by the keys 1 so that by striking the keys the instrument may be played as a piano.

There is also shown a damping bar 4 for damping the tones when the keys are actuated.

In carrying out our invention as herein set forth, the keys 1 may be actuated for practice purposes just as in playing, but instead of giving out the usual sounds or tones, there are given out no tones at all, or else tones just barely audible.

While this result may be accomplished in various different ways, we show herein a very simple and practical arrangement for securing the result. In this arrangement we provide muffling or sound suppressing devices, which may be interposed between the hammers and strings, so that said hammers when operated by the keys will strike against said interposed means and thereby cause the strings to produce tones so greatly suppressed or muffled as to be scarcely audible. In the arrangement shown a rod or bar 7 is extended crosswise of the piano, preferably from side to side of the same, having its ends mounted in suitable bearings 8 and 9 at the opposite sides of the piano case. This bar 7 is mounted to permit of its being axially rotated and is for such purpose provided with a handle 10, secured to the left end of the bar, referring to Figs. 1 and 4, and having a cross handle piece 11 which may be grasped by the hand of a person operating the piano, to permit the handle to be swung and the bar 7 to be axially rotated. In Fig. 8 the handle 10 is shown in one position, which as will be hereinafter explained, may be considered the normal position, in full lines, and in another position which as will be explained may be considered the adjusted or "silent" position. This bar or rod 7 is provided with intermediate bearings 12 and 13, which are suitably secured to the piano framework. The rod or bar 7 itself is provided with a series of tone-suppressing or muffling members, 14, 15 and 16, which are tangentially mounted on and secured to said bar or rod between the various bearings of the same. These three members 14, 15 and 16, are respectively for the bass, middle, and treble registers, being of a length to extend across the three divisions or sets of strings for those registers. These members 14, 15 and 16 are preferably composed of felt or some such material, suitable for interposition between the hammers and strings. As shown in Figs. 5 and 6, the members 14 and 15 are each composed of two layers of felt, these members being for the heavier strings. As shown in Fig. 7, the member 16 is composed of only one layer of felt, this being for the finer treble strings.

When the bar 7 is in what may be called normal position, the muffling members 14, 15 and 16 extend downwardly in a substantially vertical manner, as shown in Figs. 2, 5, 6 and 7. In this position the hammers 2 are free to strike the strings 3 and the piano action operates in the usual manner. When, however, the handle 10 is swung to the dotted position shown in Fig. 8, the members 14, 15, and 16 are swung up to a substantially horizontal position directly underneath and in contact with the lower surface of the strings 3, as shown in dotted lines in said Figs. 2, 5, 6 and 7. In this position said members 14, 15 and 16 are so located that the hammers 2 strike against said members, and not against said strings, when the piano action is operated. Therefore the sounds or tones coming from the strings are very much suppressed or muffled, so much so that preferably such sounds or tones are barely audible, but no more. Thus by adjusting the handle 10 one way or the other, the instrument may be used as a piano in the usual way, or for practicing,—giving out tones just barely audible. It will be seen that the instrument may have all the fine qualities musically and mechanically of a piano and that these are not modified or changed by the fact that the instrument may be used for practice purposes.

It will be understood that changes and modifications may be made without departing from the spirit of the invention.

What we claim is:

1. A grand piano having muffling means comprising an axially rotatable cross bar located below the strings and provided with muffling devices adapted to be moved by the rotation of said bar into and out of position between the strings and hammers, said cross bar being mounted and arranged so that said muffling devices may be moved into and out of position by rotation of said bar, said bar being provided at one end with a handle located inside of the piano case and connected to rotate the bar.

2. In a grand piano, the combination with the action, of an axially rotatable rod extending crosswise of the action in proximity to the strings, said rod being provided with a plurality of independent muffling members tangentially mounted and each consisting of one or more strips of felt and a handle at one end of the rod or bar for rotating the same, said rod or bar being mounted so that when rotated said felt strips will be thrown into and out of position between the action hammers and the strings, said felt strips being of such character as to muffle the playing tones so as to make the same almost inaudible.

In witness whereof we hereunto subscribe our names this 22nd day of November, A. D., 1918.

BENJAMIN H. JEFFERSON.
ROBERT H. WAUD.